Patented May 1, 1945

2,374,963

UNITED STATES PATENT OFFICE 2,374,963

MODIFIED OLEFIN POLYSULPHIDE PRODUCTS

Francis Vass, Arquata Scrivia, Italy, assignor to Krebs & Co., Zürich, Zurich, Switzerland, a company of Switzerland No Drawing. Application September 24, 1940, Serial No. 358,170. In Italy January 15, 1940

1 Claim. (Cl. 260—42)

This invention has for its object the preparation of novel synthetic condensation products which, according as they are prepared, may assume different degrees of hardness and other valuable properties and in some cases they may be very like rubber and have also some advantages over this product, such as that of being relatively cheap and oil resisting.

The invention aims also to provide solvents and/or swelling agents adapted to dissolve and plastify the said synthetic products, either in order to permit of obtaining a number of useful objects, or to permit of mixing same with other products, such as natural and synthetic rubbers, so as to obtain mixed products possessing more valuable properties.

According to the invention, the new synthetic products are obtained by causing carbonylic compounds including aldehydes and ketones, amines (and in some instances also amides), aliphatic halogen compounds and inorganic polysulphides, to react together in the presence of suitable catalysts, and in a basic medium containing ammonia or ammonia derivatives. Among the amines, aromatic amines are preferably employed and among the catalysts, the most suitable have been found the substances having a phenolic character. The products thus obtained, according to the invention, may be dissolved or swollen out in suitable solvents, among which some terpenic derivatives have been found to be the most suitable in order to obtain plastic masses ready for use or otherwise adapted to undergo further manipulations or working steps, whenever necessary. Furthermore the said products are readily curable, i. e. are subject to being polymerised by heat treatment.

The invention is based on the observation that the polysulphides or polyselenides, that are obtained by causing soluble inorganic polysulphides or polyselenides to react with polyhalogenated organic (preferably aliphatic) compounds, and especially di-halogenated ethylenic hydrocarbons, as ethylene chloride, or also with di-halogenated derivatives of the polyvalent alcohols, as these of glycol and of glycerine when they are prepared in the presence of the about-to-be formed condensation products of aromatic amines or amides with aldehydes or ketones, combine themselves therewith provided the multiple reaction is effected in the presence of a phenol as catalyst and in an alkaline medium, in the presence of ammonia or ammonia bases. By this combination, plastifiable masses are obtained which possess very superior properties to the compounds that have been hitherto obtained by condensation of not freshly prepared organic polysulphides with other simple reagents. It is apparent that, by starting from this basic principle, it is possible to obtain a very large number of multiple condensation products possessing different characteristics, depending upon the raw materials employed and of their proportions, as well as upon the working process.

The invention will be better understood from the following example of preparation of one of the above products.

Firstly a clear solution of an inorganic polysulphide, e. g. a solution of sodium polysulphide, is prepared by any known method, e. g. by dissolving sulphur in the corresponding sulphides, or in a warm hydroxide solution, and filtering.

Separately, a mixture of ethylene chloride, aniline and formic aldehyde is prepared. Both aniline and formic aldehyde are preferably employed in equi-molecular amounts, while the ethylene chloride may be employed in amounts varying from ½ to 1 mol for each mol of amine and aldehyde.

The inorganic, e. g. sodium, polysulphide solution prepared separately is diluted with water until its specific gravity becomes approximately equivalent to that of the aforesaid organic mixture, in order to enhance the miscibility of the two solutions. Then the organic mixture is added to the polysulphide solution in an amount corresponding to about 1 mol of ethylene chloride to 2 mols of polysulphide. The mixture of both solutions is effected preferably within a jacketed kettle-like boiler fitted with a stirring device. While continuously stirring, a concentrated ammonia solution (preferably in an amount corresponding to ½ equivalent of the ethylene chloride) and a 2% phenol solution (up to 1% of the ethylene chloride) are added.

When the mixture has become homogeneous, it is heated up to 50° C., viz. until the beginning of the reaction is detected. This reaction being an exothermic one, the evolution of the heat must be controlled and to this purpose the mixture is cooled in order that its temperature does not rise much above 50° C. As soon as the first reaction is at its end, which is apparent when the development of heat ceases, the mixture is again heated up to 60–65° C. and is then left to rest during about 8 hours.

At the end of this period the condensation product formed is separated in the form of a plastic mass adhering to the walls of the container.

The mother liquor, that is constituted of a solution of sodium and ammonium chlorides and of different sulphides, is then syphoned out and the plastic matter is allowed to flow, through a wide hole, into a suitable flat container.

The plastic mass is then washed with cold water and suitably dried.

The mass thus obtained is adapted to be dissolved or swollen out in dipentene or other like terpenes, or also in mixtures of dipentene or the like and other low boiling solvents. In this manner it is possible to obtain either plastic masses that are easily moldable to objects or sheets, or also paint-like dispersions or solutions thereof adapted to be readily applied on objects to be waterproofed, and so on.

It is to be noted that the plastic masses prepared by the above outlined process, either before or after treatment with dipentene or the like, are readily capable of being mixed with a number of other products, e. g. rubber. Furthermore, as set out, the new products, alone or filled or mixed with other products, can be vulcanized or polymerised by a heat treatment.

It is apparent that a large number of reagents having equivalent chemical characteristics may be employed instead of those already mentioned. Furthermore it is possible to arrive at the final reaction by processing the reagents in some other way.

Thus it is apparent that as polysulphides all alkaline polysulphides, including a number of polysulphides of the alkali earths and of the ammonium bases, can be employed. The amounts of sulphur to be dissolved into the sulphides or hydroxides depends upon the characteristics of the products to be obtained.

Thus, as a rule, by employing highly sulphurated polysulphides, as the pentasulphides, somewhat hard products are obtained; by employing tetrasulphides, the obtained products are rubberlike; while by employing trisulphides, soft, sticky masses are obtained. Polyselenides produce harder or tougher masses than the corresponding sulphides.

Of course, instead of aniline, a number of other aromatic or aliphatic amines, as well as a number of amides, as thiourea urea or derivatives and the like, and also mixtures of amines and amides, may be employed.

Instead of formic aldehyde, a number of other aldehydes or ketones might be employed, either alone or in mixture, among which the following may be cited: acetic, anisyl, benzyl, tolyl and protocatechu aldehydes, furfural, acetone, etc.

Instead of ethylene chloride, a number of like polyhalogenated aliphatic compounds may be employed, especially the di-halogenated ethylenic hydrocarbons and the di-halogenated derivatives of alkohols, ethers, esters, aldehydes and ketones. In these latter cases it is possible to replace, completely or in part, the aforesaid aldehydes or ketones by the said halogenated derivatives, which thus may serve for the double condensation.

As said, the same products might be prepared also by somewhat different processes, provided the polysulphide or polyselenide and the remaining reagents are in such a condition as to react together, forming very complex condensation products possessing a rubber-like character and adapted to dissolve in dipentene.

The above outlined products besides with rubber, can be blended with natural or synthetic resins and mixed with fillers and cured, all operations being performed substantially as customary in the rubber and allied industries.

I claim:

The process of manufacturing a synthetic product which comprises intermixing (1) a water soluble inorganic polysulphide, (2) a dihalogenated aliphatic hydrocarbon, (3) a carbonylic compound selected from the class consisting of formaldehyde, acetaldehyde, anisaldehyde, benzaldehyde, toluyl aldehyde, protocatechualdehyde, and furfuraldehyde, (4) an organic derivative of ammonia selected from the group consisting of aniline, thiourea, and urea, in the presence of a catalytic quantity of phenol, and applying heat to initiate the reaction.

FRANCIS VASS.